July 10, 1956 A. DILLENBURGER ET AL 2,753,957

TELESCOPING HYDRAULIC SHOCK ABSORBER

Filed Nov. 25,, 1950

INVENTORS:

Albert Dillenburger and Wilhelm Ley

BY

Richards & Geier

ATTORNEYS

United States Patent Office 2,753,957
Patented July 10, 1956

2,753,957

TELESCOPING HYDRAULIC SHOCK ABSORBER

Albert Dillenburger and Wilhelm Ley, Koblenz, Germany, assignors to Procedo G. m. b. H., Zurich, Switzerland Application November 25, 1950, Serial No. 197,624

1 Claim. (Cl. 188—88)

Telescope shock absorbers are already known in the art and used in motor vehicles because of their simplicity and considerable damping action. They require no levers, rods, shafts with control fingers, pressure tips or other driving organs because they are built-in directly between the axle of the vehicle and the body, the complete shock absorbing action of the piston thus being available for damping. The hitherto known shock absorbers, however, have the disadvantage that the excess pressure caused by the movement of the piston rod cannot be held by the rod packing. Through the leakage thus caused, the telescope shock absorber increasingly reduces its performance and must be refilled within shorter and shorter intervals. The refilling with liquid is a very complicated and time-consuming operation, and it can only be carried out by a specialist because the quantity of liquid must be adjusted with precision. If, for example, too much liquid is introduced, the penetration of the piston rod into the working cylinder will produce an excess of pressure which cannot be held by the packing; the packing would be damaged and would thus no longer be tight even if the normal quantity of liquid be introduced.

The above disadvantages are obviated by the present invention.

The present invention is characterized by the use of an axially movable packing element, which is spring-supported on at least one side, in such a manner that it resiliently absorbs pressure caused by the movement of the piston and compensates volumetric changes produced by the movement of the piston rod.

A substantial advantage of the shock absorber according to the invention resides in the fact that by using a special arrangement of the packing element it is also possible to produce a telescope shock absorber with a working cylinder only, the packing element then replacing the foot valve.

In the drawing two embodiments of the shock absorber according to the invention are illustrated.

Figure 1:
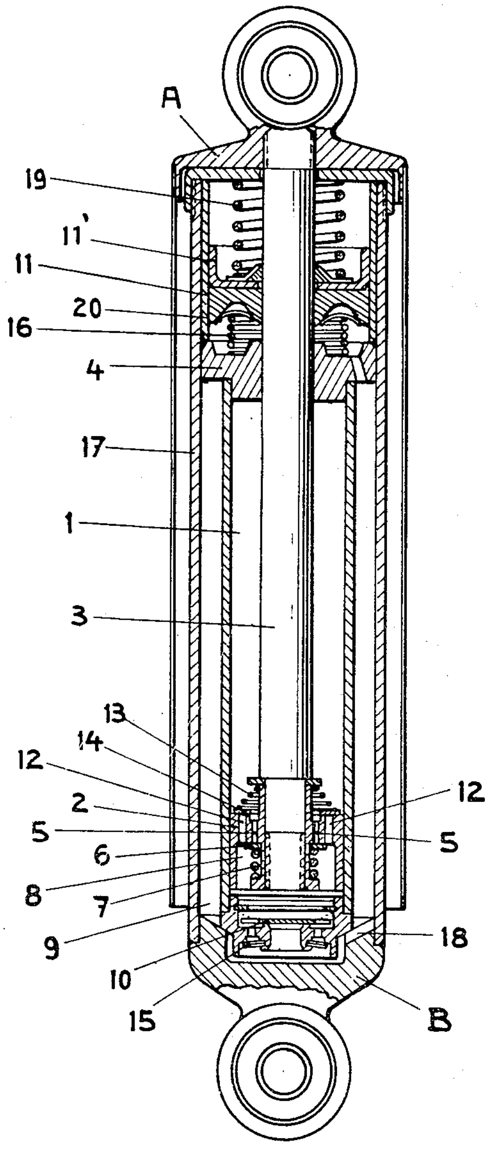
Fig. 1 shows a sectional view of a first embodiment.

The telescope shock absorber as illustrated in Fig. 1 comprises a cylindrical housing A for connecting to the body of the vehicle and, coaxially with this housing, a cylindrical housing B, which is to be connected with the axle of the vehicle. In the housing A a piston rod 3 with a working piston 2 is fixed, the latter being movable in a pressure cylinder 1 filled with a liquid. The pressure cylinder 1 is fixed at one end to a disk-shaped partition 4 which in its turn is permanently fixed to a cylinder 17 arranged coaxially with the pressure cylinder 1. This cylinder 17 is fixed to the housing B at the end remote from partition 4.

Piston 2 is provided with two openings 5 and 12 which are controlled by means of valves 6 and 14 respectively. Valve 6, subject to the action of a spring 7, is dimensioned to operate as a high-pressure valve, and it opens towards the chamber 8 which is located below the piston 2. Valve 14 which is dimensioned to operate as a low-pressure valve, is subject to the action of a spring 13, and it opens towards the cylinder space above piston 2. The space 9 available between cylinder 1 and cylinder 17 is an accumulation chamber for the liquid, and it is connected with the chamber 8 below piston 2 by means of a duct 18 and valves 10 and 15.

On the upper side of partition 4 a spring 16 is arranged the other end of which rests against a disk-shaped packing 11 which is movable axially. Between packing 11 and partition 4 a further accumulation chamber is available which is connected with the space 9. The side of packing 11 remote from spring 16 rests against a guide 11′ which is pushed against the packing by the action of a stronger spring 19. The pressure of the weaker spring 16 is exerted on the packing 11 through an intermediate circular washer 20 with a curved surface. This circular washer 20 is pressed by spring 16 against the packing lips of packing 11 in such a manner that these lips produce a tightening effect on piston rod 3 and on cylinder 17.

The working of the telescope shock absorber described is as follows: When the working piston 2 operating in the pressure cylinder 1 filled with liquid is pulled by the piston rod 3 towards the partition 4, the liquid in front of the piston is forced through the openings 5, the flow of the liquid being throttled by the high pressure valve 6 loaded by spring 7; this causes considerable damping. The liquid displaced during such action and passing into the chamber 8 is not, however, sufficient to fill that chamber completely, since the quantity of liquid corresponding to the volume of the piston rod 3 is lacking. This quantity of liquid must be obtained by suction through valve 10 from space 9. Simultaneously, the volume of the accumulation space above partition 4 is reduced correspondingly to the quantity of liquid removed by suction, this reduction being obtained by expansion of spring 19 and a downward motion of packing 11.

When piston 2 is actuated in the opposite direction, the liquid is displaced from chamber 8 by the piston, such displacement being effected through the openings 12 and through the low pressure valve 14 causing less damping. During this movement the piston rod 3 again penetrates into cylinder 1, simultaneously displacing through valve 15 back into the space 9 a quantity of liquid corresponding to its volume. Correspondingly to the quantity of liquid returned into the space 9, the space above the partition 4 will again be increased by compression of spring 19 and a backward motion of the packing. Thus during both movements an exchange of liquid takes place.

An excess of pressure occurring during working is resiliently compensated by the packing 11 because of the yielding of spring 19.

The spring 16 is so adjusted with respect to spring 19 that the tightening effect on piston rod 3 as well as the alternate action of packing 11 is made easy and reliable.

Figure 2:
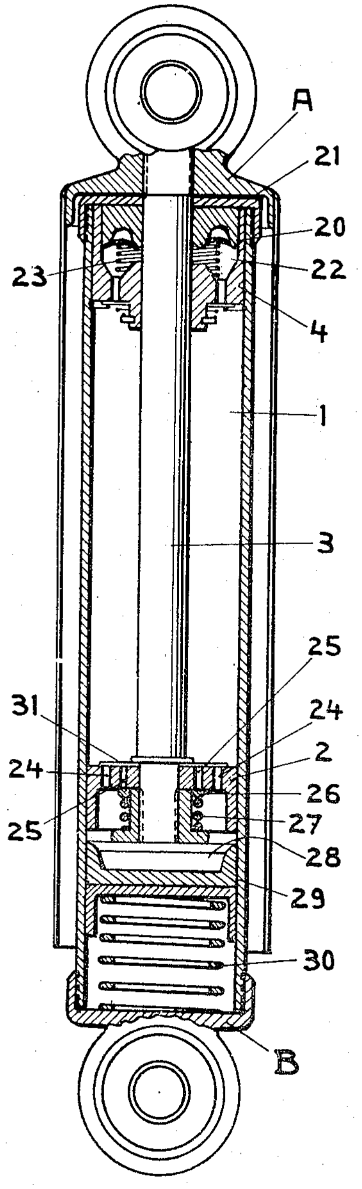
Fig. 2 shows a sectional view of a second embodiment.

Fig. 2 shows an embodiment of a shock absorber which, contrary to the example according to Fig. 1, has only a working cylinder without any accumulation chambers.

This shock absorber also possesses a housing A and, coaxial with the latter, a housing B. In the housing A a piston rod 3 with a working piston 2 is fixed, the latter being movable in a working cylinder 1 fixed to the housing B.

In the upper part of cylinder 1 adjacent to the housing A a partition 4 with openings is arranged through which the space 22 above partition 4 is connected with the space in cylinder 1. In the space 22 a packing 21 is arranged, the downward lips of which are pressed against piston rod 3 and against a portion of partition 4 by means of a curved circular washer 20 and a spring 23 which produces a tightening effect.

Piston 2 is provided with openings 24 and 25, the openings being controlled by means of a high pressure valve 26 cooperating with a spring 27. The openings 24 are provided with a low pressure valve 31.

Below piston 2 chamber 28 is provided which is closed at the bottom by a packing 29. This packing 29 is controlled by a spring 30 and is arranged movably in the working cylinder 1.

The working of this embodiment is as follows: When piston 2 is pulled towards partition 4, the liquid in the cylinder flows into the chamber 28 through the openings 25; damping is obtained by this throttle action.

The liquid displaced during such action and passing into the chamber 28 is not, however, sufficient to fill that chamber completely. Thus the volume of chamber 28 has to be reduced correspondingly to the missing quantity of the liquid, and this is effected by the packing 29 moving towards piston 2 under the action of spring 30.

When piston 2 is actuated in the opposite direction, the liquid is displaced from chamber 28 through openings 24 into the cylinder space on the opposite side of piston 2 and the chamber 28 has to be increased in size in order to compensate for the volume of the penetrating piston rod; this is obtained by a movement of the packing against the action of spring 30 the tension of which is increased.

What we claim is:

A shock absorber for damping road shocks of a vehicle having a chassis and a wheel axle, said absorber comprising: a cylindrical housing adapted for coupling at its upper end to the chassis; a pressure cylinder telescoped in said housing having its lower outer end closed by a cap adapted for engagement with the axle; a movable packing in said closed end of the pressure cylinder; a spring between said closed end and said packing; a piston movable in said pressure cylinder above said packing; liquid in said pressure cylinder above said packing; a high pressure valve in said piston permitting the flow of liquid under pressure from above said piston into the space below the piston; a spring biasing said valve to closed position; a low pressure valve in said piston controlling flow from below to above said piston; a piston rod extending from said piston to said cylindrical housing; a fixed packing member at the top of said pressure cylinder; lips on said packing member; a cup shaped partition surrounding said rod in said pressure cylinder; a washer pressing said lips against the side walls of said cup shape partition and said rod; and a spring between said partition and said washer to force said washer against said lips.

References Cited in the file of this patent

UNITED STATES PATENTS

| | | |
|---|---|---|
| 1,261,011 | Cook | Apr. 2, 1918 |
| 1,590,414 | Bosserdet | June 29, 1926 |
| 2,020,122 | Padgett | Nov. 5, 1935 |
| 2,424,198 | Tauscher | July 15, 1947 |
| 2,537,423 | Rossman | Jan. 9, 1951 |
| 2,576,658 | Werner | Nov. 27, 1951 |
| 2,607,443 | Mayo et al. | Aug. 19, 1952 |